June 16, 1931. W. C. JAY 1,809,852
SUCTION PLATE MACHINE
Filed May 29, 1930 4 Sheets-Sheet 1

Inventor:
William C. Jay
By Macleod, Calvert, Copeland & Dike
Attorneys.

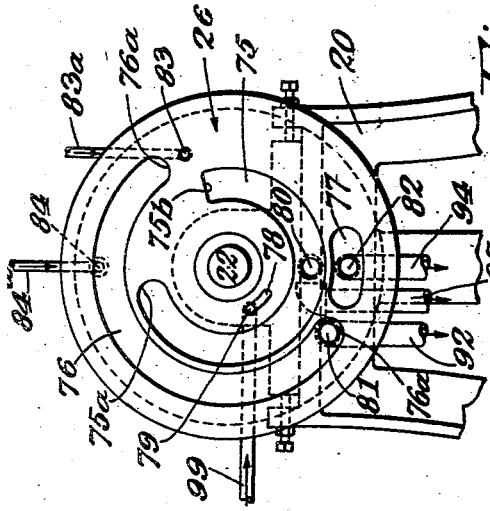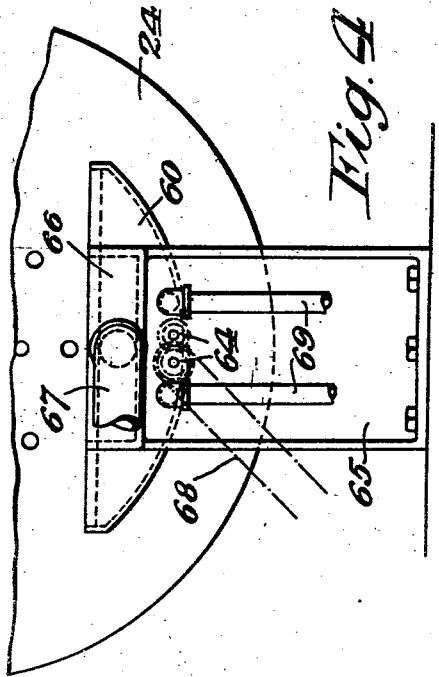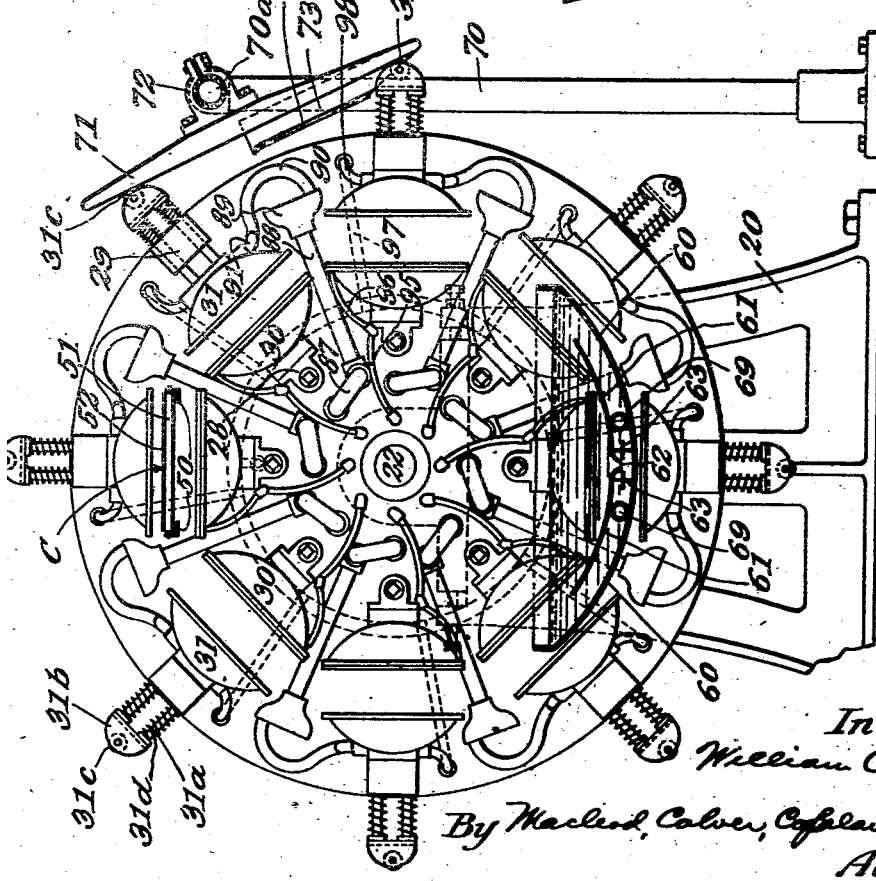

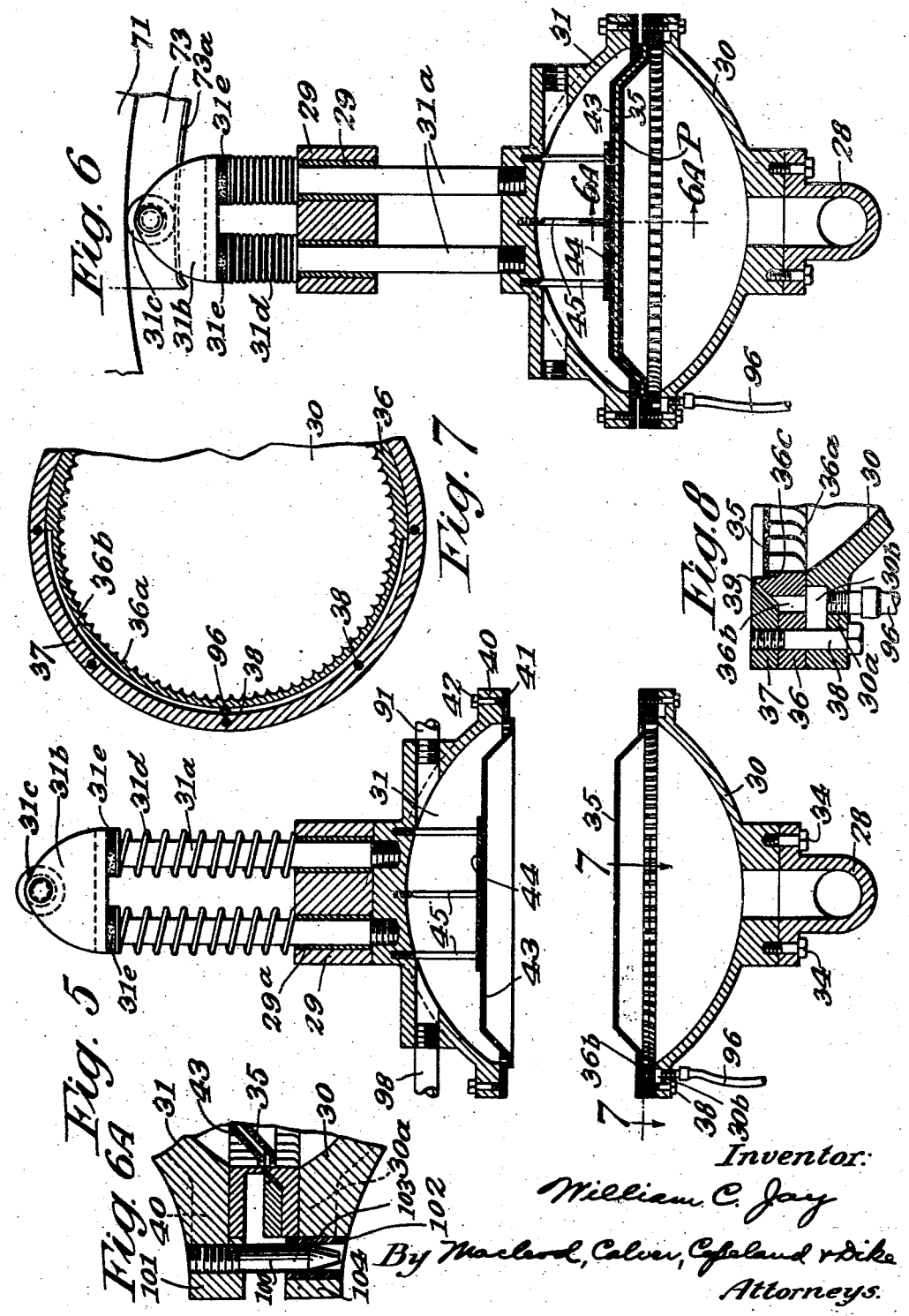

June 16, 1931.  W. C. JAY  1,809,852
SUCTION PLATE MACHINE
Filed May 29, 1930  4 Sheets-Sheet 4
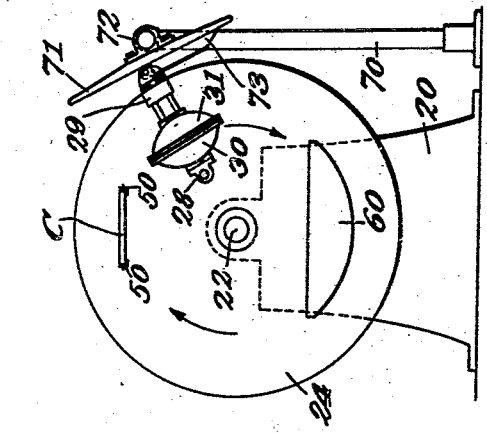
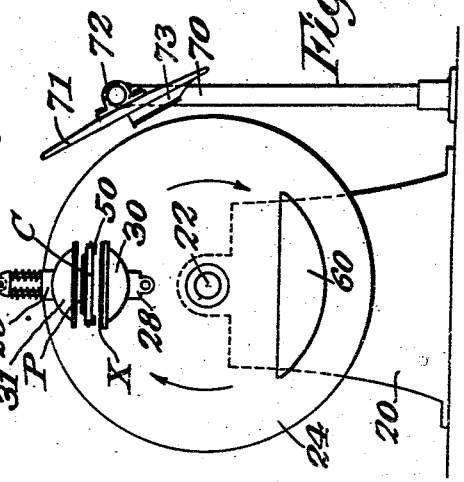
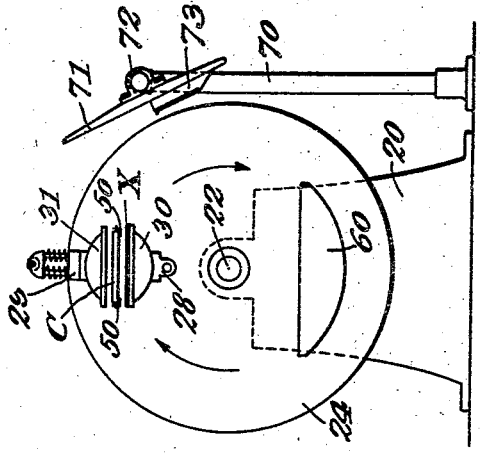
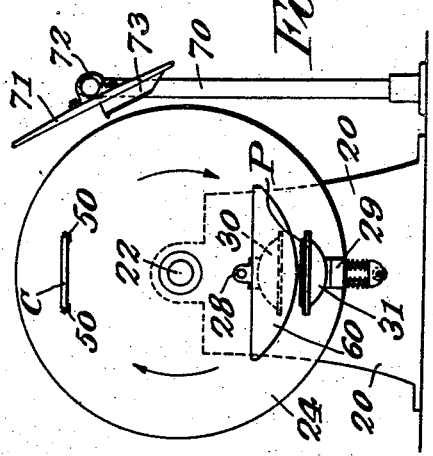
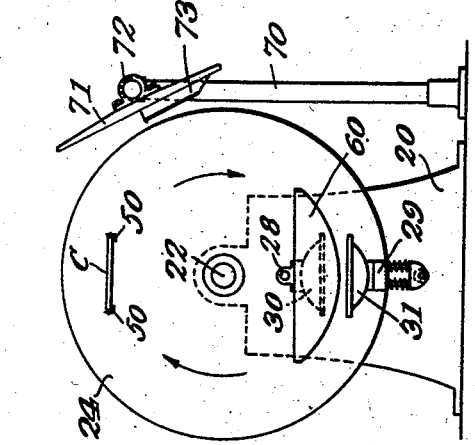
Inventor:
William C. Jay
By MacLeod, Calver, Copeland & Dike
Attorneys.

Patented June 16, 1931

1,809,852

UNITED STATES PATENT OFFICE

WILLIAM C. JAY, OF PHILADELPHIA, PENNSYLVANIA, ASSIGNOR TO SANITARY PRODUCTS CORPORATION OF AMERICA, OF PHILADELPHIA, PENNSYLVANIA, A CORPORATION OF VIRGINIA

SUCTION PLATE MACHINE

Application filed May 29, 1930. Serial No. 456,846.

This invention relates to a machine for forming articles, such, for example, as paper plates, from pulp, and has among other objects to provide a machine of the foregoing character capable of producing articles of superior quality, cheaply and in large volume, and in which the articles are practically freed of all moisture before issuing from the machine, without the aid of any artificial drying. Another object is to provide a machine capable of producing finished articles having smooth edges or peripheries without the use of any mechanical means for cutting or trimming said edges. Another object is to provide a machine in which practically the entire area of the foraminous portion of the formers is exposed to the action of suction or compression, thus making possible the production of more perfect articles than has been possible heretofore.

A further object of the invention is to provide a machine capable of producing articles of a uniform grade and thickness, and one which is capable also of producing articles of different sizes at the same time.

Other objects of this invention will appear in the specification and claims hereinafter.

The machine of this invention belongs to that class of automatic machines for making or molding articles from pulp in which cooperating foraminous molds or formers, to which suction is applied, collect the pulp and form or shape it into finished articles. The particular embodiment of the machine shown in the accompanying drawings, is one which comprises a rotary head having inner and outer coaxial cylindrical portions or supporting arms, which carry, respectively, inner and outer series of complementary foraminous formers or mold members, arranged in pairs, the formers of the inner and outer series being capable of movement toward and from one another in cooperative relation as the head rotates. A pulp holder or trough is positioned between the two cylindrical portions so that as the head rotates, the inner series of formers pass through the trough, whereas the outer series pass on the outside thereof, or below the trough. The trough is supplied with a mixture of pulp and water from any convenient source and this mixture is kept continuously mobile and in an agitated state. Preferably, an endless belt or conveyor is positioned opposite the pulp trough and also between the paths of movement of the inner and outer series of formers to receive the finished articles from the outer series of formers.

As the head rotates, suction and compression are applied to the several series of formers at predetermined times, for the purpose of collecting pulp upon the foraminous portions of the formers of the inner series, maintaining the pulp thereon until the two series are moved radially into engagement with one another, transferring the articles from the inner to the outer series and maintaining them in position upon said outer series throughout at least 180° of the travel of the head, and then discharging the articles onto the conveyor. During a portion of the suction operation of collecting the pulp onto the foraminous portions or screens of the inner series of formers or mold members, and while these formers are submerged in the pulp, a constant blast of air or compression is applied to each former around a portion of its periphery or rim to remove any loose particles of pulp (whiskers) which may collect thereon.

In the drawings:

Fig. 2 is a front elevation of the machine of Fig. 1.

Fig. 3 is a front elevation of the valve structure of the machine, shown on an enlarged scale.

Fig. 4 is an enlarged detail view of the pulp trough or tank and agitating means for the pulp.

Fig. 5 is a vertical sectional view of a pair of formers or pulp molds comprising one mold unit in open position.

Fig. 6 is a view of the unit of Fig. 5 with the formers in closed position.

Fig. 6A is a detail fragmentary sectional view, taken substantially along the line 6A—6A of Fig. 6, showing one manner of maintaining the closed mold members in alinement.

Fig. 7 is a fragmentary cross sectional view of the inner former taken substantially along the line 7—7 of Fig. 5.

Fig. 8 is an enlarged fragmentary sectional view of the inner former.

Figure 1:
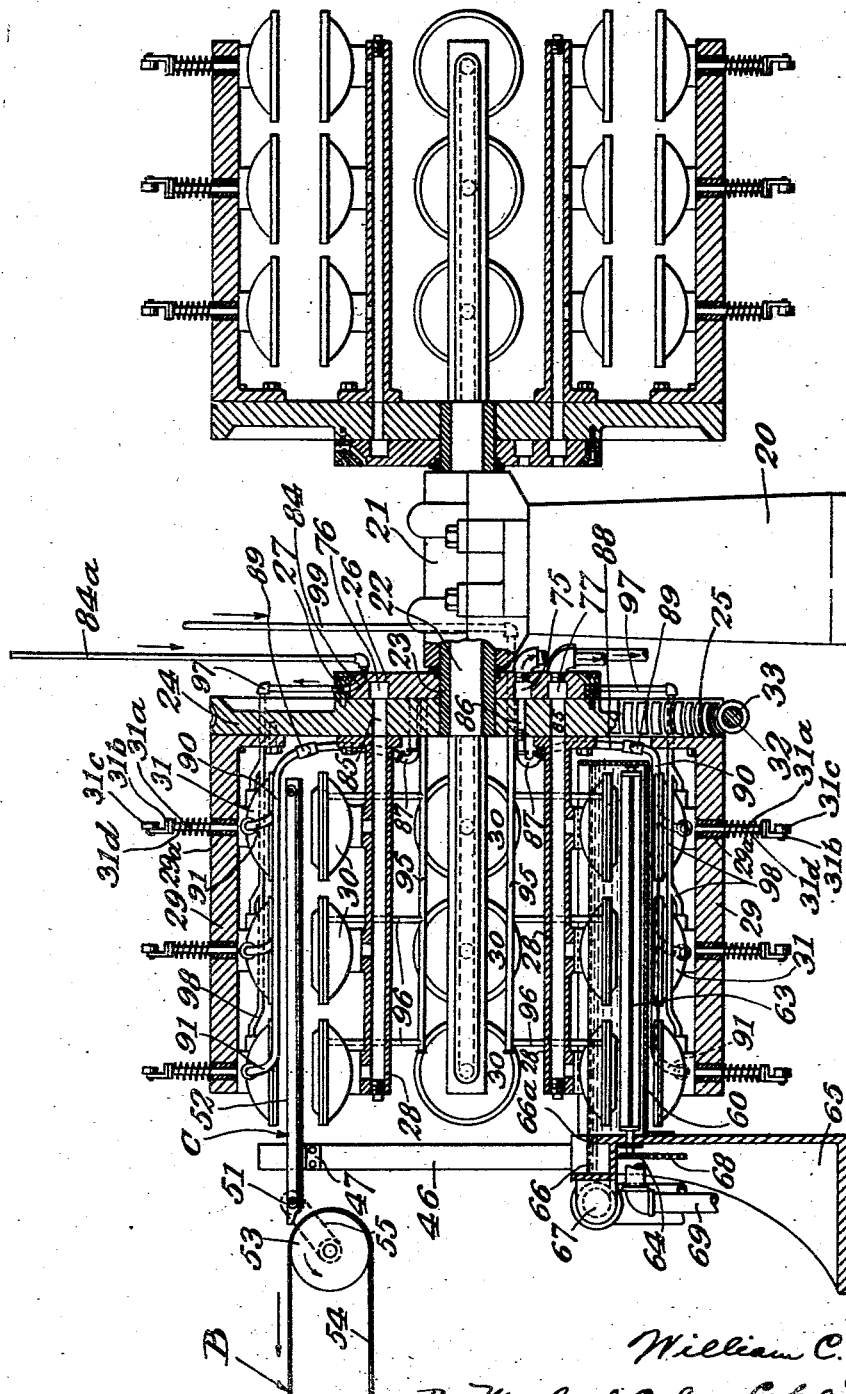
Fig. 1 is a longitudinal section, partly in elevation, of one embodiment of my invention.

Figs. 9 to 13 inclusive are diagrammatical views illustrating the cycle of operation of one unit or pair of formers of the machine.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

I have described in general above the construction and operation of the machine shown in the drawings, that is, one unit of said machine. Referring now particularly to the drawings, it will be seen that I have shown two machines supported in tandem relation but since both machines are identical, a description of one will suffice. The complete machine is shown at the left of Fig. 1 and between the two machines there is provided a vertical standard or support 20 carrying a split adjustable bearing 21 which supports a horizontal shaft 22. The shaft 22 is surrounded by a sleeve 23 which carries a bull wheel or head 24 having a toothed periphery 25 which rotates with the sleeve and shaft. The sleeve and shaft have keyed to them a stationary valve 26 in the form of a disk provided with a plurality of valve ports and passages therein. The bull wheel is also provided with a plurality of passages which are adapted to register with the ports and passages in the valve during the relative rotation of the parts. The bull wheel and valve are maintained in their relative positions by means of a detachable locking ring 27 which is secured to the bull wheel by means of bolts, or in any other suitable manner. The front face of the bull wheel 24 is provided with a plurality of inner hollow supports or arms 28 and a plurality of outer supporting arms or bracket members 29, for supporting the inner and outer formers or mold members 30 and 31 respective, hereinafter fully described.

The bull wheel 24 with its attached parts is rotated by reason of its toothed periphery 25 being in engagement with a worm 32 carried upon a rotary driven shaft 33, which may be driven by means of an electric motor, or in any other suitable manner, so as to cause a substantially continuous rotation of the bull wheel or head and the several formers or mold units carried thereby. There may be, however, a slight dwell in the rotation of the bull wheel during each revolution, preferably at the point where the articles are shifted from the inner to the outer set of mold members (Fig. 11).

Referring particularly to Figs. 5 to 8 inclusive, the inner formers or mold members 30 are fixed in spaced relation upon the hollow supports or arms 28, whereas the outer formers or mold members 31 are each provided with a pair of rods 31a which extend through bushings 29a and which are provided at their outer ends with cap pieces 31b, having journalled therein rollers 31c. Coil springs 31d surround the rods and serve to normally maintain the mold members 31 in their outer position and in contact with the supports 29. Rubber pads 31e are interposed between the springs and cap pieces and act as shock absorbing means when the machine is in operation.

Each inner former or mold member 30 preferably comprises a shell which is secured by means of bolts or the like 34 to the hollow arm 28 and comprises a foraminous face or male forming screen 35. This screen is shaped to conform to the inner face of a plate to be molded by the machine. The shell of the member 30 is provided with a flange 30a which has an annular slot or groove 30b formed therein. Positioned above the flange 30a is an annular ring 36 having a fluted inner periphery to form a plurality of recesses 36a as best shown in Figs. 7 and 8. The ring 36 is provided with a semi-circular slot or cut-out portion 36b which extends around one-half of the ring at its rear side when the mold member is travelling in a clockwise direction with its supporting arm. The ring 36 is also provided with an annular shoulder 36c on its inner surface to receive the flange of the screen 35 which is held in place therein by means of solder, or in any other suitable manner. Another ring 37 is provided and these two rings 36 and 37 are held in position upon the flange 30a by means of bolts or the like 38. It will be seen that the rings 36 and 37 are spaced apart so as to provide an inwardly and upwardly inclined annular space or slot 39, which space is in communication with the slots 36b and 30b, the purpose of which will be hereinafter described.

The outer mold member or former 31 is likewise provided with a shell having an annular flange 40 and with an annular ring 41 held in position upon the flange by means of bolts or the like 42. The ring 41 is fluted on its inner periphery in the same manner as the ring 36, above, and is provided with a shoulder to receive the flange of the female forming screen 43 which is held in place by soldering. The screen 43 conforms to the exterior shape of a plate to be molded. In order to reenforce the screen member 43, a metal ring or perforated disk 44 is provided which is supported in place against the inner face of the screen by means of a plurality of threaded rods 45, which are threaded into the shell of the outer former or mold member. In Fig. 5 the inner and outer mold members are shown separated, whereas in Fig. 6 they are shown in closed cooperative relation, and in this figure it will be seen that a layer of pulp to form a plate P is interposed between the male and female screen members 35 and 43, respectively.

Referring to Fig. 6A, it will be seen that I have shown one manner of maintaining the mold members 30 and 31 in alignment when they are in closed position. Such means comprises, preferably, pins or studs 100, threaded into drilled holes formed in ears or projections 101 on the flange 40 of the outer mold member, which register with and fit within sleeves or bushings 102 positioned in holes 103 drilled in similar ears 104 extending outwardly from the flange 30A of the inner mold member, when the mold members are in closed position.

At the top of the machine and positioned within the space between the inner and outer mold members there is provided an endless conveyor C (Figs. 1 and 2) which is adapted to receive the finished articles from the outer mold members and transfer them forwardly to a second endless conveyor or belt B which carries them away from the machine. The conveyor C is supported in any suitable manner, as by means of uprights 46 and brackets 47 at opposite sides of the machines. Referring particularly to Fig. 2 it will be seen that the conveyor C comprises a pair of angle bars 50 in which are journalled rollers 51 over which an endless belt of fabric or the like 52 passes. The belt 52 is moved continuously in an outward direction in proportion to the rate of speed of rotation of the mold members and their supporting structure. Cooperating with the conveyor C is another endless belt conveyor B having a driven roller 53, for moving, continuously, the belt or apron 54. This roller 53 is connected with the roller 51 in any suitable manner such as by means of sprockets and a sprocket chain shown generally at 55 to drive the conveyor C. The belt or apron 54 receives the articles from the belt 52.

Positioned at the bottom of the machine opposite the endless conveyor C is a pulp trough or tank 60 (see Figs. 1, 2 and 4) which is likewise positioned in the space between the paths of movement of the inner and outer mold members. Positioned within the pulp trough and spaced from the bottom thereof is a pair of baffles or plates 61 the inner edges of which are curved downwardly and spaced apart at 62. Located in the space between the bottom of the pulp trough and the plates 61 and on opposite sides of the space 62 is a pair of agitators 63, the shafts of which extend forwardly and are provided with gears 64 that intermesh. It will be seen that the front end of the pulp tank and the shafts of the agitators are carried by a support 65 which is positioned at the front end of the machine and rests upon the floor. This support is provided at its upper end with a trough or space 66 to which is connected an overflow pipe 67 for the pulp. The gears 64 are preferably driven by an electric motor (not shown) through the medium of a sprocket and chain shown as a whole at 68. Pulp under pressure is carried through pipe lines 69 and admitted to the bottom of the pulp trough through a series of holes or nozzles (not shown) which produce an additional or directional flow of the pulp. The agitators and jets or nozzles serve to maintain the pulp constantly mobile and therefore maintain it always in agitated condition so that the feed is from the bottom of the trough up and over the outside edges of the plates 61 and back through the space 62, thus providing at all times a fresh and thoroughly mixed pulp solution to the inner mold members. The overflow of the pulp solution passes over the wall 66a into the trough 66 and then passes back to the main pulp supply (not shown) through the overflow pipe 67.

Positioned preferably at the right hand side of the machine is a pair of vertical standards or supports 70 (one only being shown in Fig. 2) which carry at their upper ends a rod or pipe 70a, rigidly secured to the supports, said rod or pipe supporting spaced cams 71 and box cams 73 mounted upon brackets 72 in such a manner as to be adjusted when desired about the rod. The box cams are preferably in the form of an angle bar attached to the lower portion of the cams 71, and each has a flange 73a which is spaced from and substantially parallel to the face of the cam 71. There is a cam 71 and a box cam 73 provided for each annular series of outer mold members. The box cams 73 insure the positive opening or separation of the mold members in the event the springs 31d fail to act.

The valve member 26 is best shown in Fig. 3 and comprises a pair of circularly disposed grooves or ports 75 and 76. Both ends of the groove 76 are rounded off as shown at 76a, whereas one end 75a of the groove 75 is rounded off and its opposite end 75b is cut straight across. A relatively smaller groove or port 77 is also provided in the inner face of the disk valve and is positioned beyond one end of the port 76, and is located at the same distance from the center of the valve as the port 76. Between the port 75 and the axis of the valve is a relatively small elongated port or groove 78 which communicates with a hole or orifice 79 which extends through to the back or rear face of the valve. Holes or orifices 80 and 81 extend through the rear face of the valve member and communicate with the inner and outer ports 75 and 76 respectively. A similar hole 82 communicates with the port 77. Another hole or orifice 83 extends through the rear wall of the valve member and at a point beyond one end of the port 76. The valve is also provided with an inwardly and upwardly extending hole or orifice 84 (Fig. 1) which extends from the rear wall to the face of the periphery of the valve member.

It will be seen that the hollow supporting arms 28 which carry the inner mold members 30, communicate by means of orifices or passages 85 with the port 76 and that the outer mold members 31 are in communication with the port 75 in the valve member through the medium of a passage 86 extending through the bull wheel 24 to which is connected a U-pipe or coupling 87 which in turn is attached to a pipe 88 having at its outer end a condulet 89. Attached to the condulet is a main pipe 90 having branch pipes 91, each of which branch pipes leads to its respective outer mold member and is connected to the shell thereof. The condulets 89 provide means for the attachment of several pipes 90 if desired. Referring particularly to Fig. 3 it will be seen that vacuum or suction is applied to the port 76 and to the inner mold members by means of a pipe 92 and that vacuum or suction is applied to the port 75 by means of a pipe or conduit 93 which communicate with said ports through the orifices 81 and 80, respectively. Vacuum or suction is also applied to the inner mold members 30 while they are submerged in the pulp to collect the same and form the articles, through the medium of a suction or vacuum line comprising the pipe 94 which communicates with the port 77 through the orifice 82. The inner mold members are provided with means for supplying a blast of air during a part of the pulp collecting operation, said means comprising a main pipe 95 connected to the bull wheel 24 and communicating with the port 78. This pipe is provided with branch lines 96 which extend to the respective inner mold member shells and which are connected to the flange 30a of the mold members and communicate with the annular space 30b and the slots 36b and 39.

The outer mold members are each provided with a "blow-off" connection for transferring the finished articles from the mold members 31 to the conveyor C, which comprises a main pipe line 97 which is connected to the ring 27 and registers with the orifice 84 during every eighth of a revolution of the machine, the main pipe line being provided with a plurality of branches 98 each of which is connected with an outer mold member. The orifice 84 is in communication with a source of air supply through the medium of a supply pipe 84a. In certain positions during the rotation of the concentric arms carrying the inner and outer mold members, the orifices 85 of the respective inner mold members will communicate with an orifice 83 in the valve member to which air under pressure is supplied through a pipe 83a, this pipe supplying what is referred to for convenience as "momentary" air pressure which is applied to the inner mold members to break the vacuum thereon and assist in the transfer of the article from the inner to the outer mold member, subsequent to the passage of the mold member by the cam 71, and box cam 73.

The air pressure for the main and branch pipes 95 and 96, forming a part of the means for removing the "whiskers" during the suction operation of the machine, is supplied through a pipe 99 which communicates with the port 78 in the valve through the orifice 79.

The operation of the machine is as follows:—

Pulp is fed to the pulp trough through the feed lines or pipes 69, and the agitators 63 are rotated to force the pulp from the space between the plates or baffles 61 and the bottom of the trough 60 to the space above said plates, the overflow passing out over the wall 66a and into the space or compartment 66 and back to the source of supply through the overflow pipe 67. The motor (not shown) or other suitable means is then set into operation to rotate the shaft 33, the worm gear 32 on which is in mesh with the teeth 25 of the bull wheel, thus rotating the bull wheel or head and the entire structure in a clockwise direction as shown by the arrow in Fig. 2. The operation will be best understood by referring to Figs. 9 to 13 inclusive which show the complete cycle of operations for one unit or pair of cooperating mold members. As the first inner mold member 30 enters the pulp trough, vacuum is immediately supplied thereto by means of the pipe 94 which communicates, through the medium of the orifice 82, ports 77 and 85, with the hollow support 28 and to the interior of the mold member 30. Just prior to the time the mold 30 leaves the trough a blast of air is supplied to the semi-circular slot 36b from the air feed line 99 through the medium of the orifice 79, port 78 and main and branch pipes 95 and 96. Thus it will be seen, that during a portion of the time that suction is collecting pulp onto the foraminous face 35 of the mold member, a blast of air is being applied to the rear half of the periphery of the mold member so as to blow off any undesirable collection or accumulation of pulp fibre (whiskers) at this point. The movement of the mold member itself is sufficient to remove or prevent any collection of loose pulp fibres or "whiskers" on the front half or portion of the mold. The purpose of providing the mold members with the fluted portions 36a is to permit a greater area of the flange or edge of the article being molded to be subjected to suction than would be possible if the inner periphery of the rings 36 were solid. The cooperating pairs of mold members are maintained separated during the collection of pulp on the inner mold member. After the inner mold member emerges from the pulp, suction is applied thereto by means of the suction pipe line 92, orifice 81, port 76 and passage 85 and through the other connections previously mentioned. It will be seen in Fig. 9 that the outer mold member 31 of the pair passes beneath or outside the pulp trough and during its passage suction is also being supplied to its interior from the supply pipe or line 93 through the medium of the orifice 80, port 75, passage 86 and connecting pipes 87 and 88, condulet 89 and pipes 90 and 91. When the parts reach the conveyor it will be seen that they remain in their same relative positions; that the inner mold member carrying the layer of pulp passes beneath the conveyor C and the outer mold member over the top thereof. On further clockwise movement the roller 31c comes into contact with the cam 71 and the outer mold member 31 is moved into closed position in contact with the inner mold member 30 to form the article. At this point, suction is still being applied to both inner and outer mold members to extract the moisture from the pulp. When the members are compressed together the orifice 85 passes beyond the end 76a of the port 76 and cuts off the vacuum, while immediately thereafter a blast of air is applied to the inner mold member 30 from the pipe 83a through the medium of the ports 83 and 85 which come into register at this point, thus serving to break the vacuum and assisting in the operation of loosening the plate from its position upon the screen 35. As suction is still being maintained upon the outer mold member 31 it will be seen that the molded article will be transferred to the screen former 43 thereof. On further movement of the mold member, the roller 31c rides against cam 71 and into the box cam 73, over the flange 73a, which, with the coil springs 31d, functions to again return the outer mold member to its position in contact with its supporting arm 29.

The mold members then continue rotating and as they reach the position in which they are shown in Fig. 12 it will be seen that the inner mold member 30 is again submerged in the pulp trough while the outer mold member 31 with its supported article passes below or outside the pulp trough. Suction is of course being maintained on the inner and outer mold members and another layer of pulp is collected on to the face of the inner mold member. This suction is maintained and as the mold members, on further rotation, reach the positions in which they are shown in Fig. 13, a blast of air is provided to the outer mold member 31 from the pipe line 84a through the medium of the orifice 84 and the connecting pipes 97 and 98 to force the plate or other completed article P out of the mold member and onto the endless conveyor C. In this position the second layer of pulp collected by the inner mold member 30 is shown at X. It will be seen, therefore, that the first article formed, after being transferred from the inner mold member to the outer mold member as shown in Fig. 11 is supported by the outer mold member and is carried thereby for more than 180° of a revolution, thus permitting a substantial drying of the article prior to its discharge onto the conveyor C.

It will be understood that any number of pairs of inner and outer mold members may be carried by their supporting arms dependent, of course, upon the diameter of the mold members and the length of the supporting arms. Moreover, it will be understood that pairs of mold members or units of varying diameters may be supported by the same supporting arms so that a single machine is capable of producing articles of different sizes at the same time.

From the foregoing it will be seen that the operation of forming articles by the machine of my invention, is a continuous one, and by reason of the fact that these articles are subjected to suction and are carried by the machine, after being formed, for more than 180° of a revolution, are sufficiently dry before they are discharged from the mold members onto the conveyor, without the necessity of employing any auxiliary drying means for them.

Having thus described my invention, I claim:

1. In a machine for forming articles from pulp, in combination, a pair of complementary foraminous formers, means for supplying pulp to said formers, means for causing said formers to travel as a unit toward and away from said pulp supplying means, means for moving said formers toward and away from one another during their travel as a unit, means for applying suction and compression to said formers respectively at suitably timed intervals during their travel, and a conveyor located adjacent the path of travel of said formers and between the same when separated to receive the completed articles therefrom.

2. In a machine for forming articles from pulp, in combination, a pair of complementary foraminous formers, means for revolving said formers as a unit about a common axis, means for applying suction and compression to said formers respectively at suitably timed intervals during their revolution, means for relatively moving said formers toward and away from one another in a direction radial to said axis, and a pulp tank located adjacent the path of travel of said formers and between the same when separated, whereby one of said formers passes through said tank and the other passes about the outer side thereof.

3. In a machine for forming articles from pulp, in combination, a pair of complementary foraminous formers, means for revolving said formers as a unit about a common axis, means for applying suction and compression to said formers respectively at suitably timed intervals during their revolution, means for relatively moving said formers toward and away from one another in a direction radial to said axis, a pulp tank located adjacent the path of travel of said formers and between the same when separated, whereby one of said formers passes through said tank and the other passes about the outer side thereof, and a conveyor to receive the completed articles likewise located between said formers.

4. In a machine for forming articles from pulp, in combination, a rotary carrier, two annular series of oppositely disposed complementary foraminous formers arranged on said carrier coaxially therewith, means for rotating said carrier, means for applying suction and compression to said formers respectively at suitably timed intervals, means for relatively moving the opposite formers of the respective series toward and from one another in a radial direction at certain points during their travel with said carrier, and a pulp tank located between said series of formers at a point where the latter are separated.

5. In a machine for forming articles from pulp, in combination, a pair of complementary foraminous formers, means for revolving said formers as a unit about a common axis, means for closing said formers upon one another and separating the same as they are revolved, a pulp tank disposed in the path of one of said formers, and means for applying suction and compression to the respective formers, said respective parts aforementioned being so constructed, arranged and timed that suction is caused to be applied to said last named former during its passage through said tank and throughout at least 180° of its travel thereafter, that said formers are closed upon one another and while they are closed compression is applied to said first named former and suction to the complementary former, that said formers are separated prior to their arrival at said tank, that said suction is maintained on said complementary former throughout substantially 180° of its travel beyond said tank, and that thereafter compression is applied to said complementary former.

6. In a machine for forming articles from pulp, in combination, a pair of complementary foraminous formers, means for revolving said formers as a unit about a common axis, means for closing said formers upon one another and separating the same as they are revolved, a pulp tank located adjacent the path of travel of said formers and between the same when separated, whereby one of said formers passes through said tank and the other passes about the outer side thereof, and means for applying suction and compression to the respective formers, said respective parts aforementioned being so constructed, arranged, and timed that suction is caused to be applied to said first named former during its passage through said tank and throughout at least 180° of its travel thereafter, that said formers are closed upon one another and while they are closed, compression is applied to said first named former and suction to the complementary former, that said formers are separated prior to their arrival at said tank, that said suction is maintained on said complementary former throughout substantially 180° of its travel beyond said tank, and that thereafter compression is applied to said complementary former.

7. In a machine for forming articles from pulp, in combination, a pair of complementary foraminous formers, means for revolving said formers as a unit about a common axis, means for closing said formers upon one another and separating the same as they are revolved, a pulp tank disposed in the path of movement of one of said formers, means for applying suction and compression to the respective formers, said respective parts aforementioned being so constructed, arranged, and timed that suction is caused to be applied to said last named former during its passage through said tank and throughout at least 180° of its travel thereafter, that said formers are closed upon one another and while they are closed compression is applied to said first named former and suction to the complementary former, that said formers are separated prior to their arrival at said tank, that said suction is maintained on said complementary former throughout substantially 180° of its travel beyond said tank, and that thereafter compression is applied to said complementary former, and a conveyor arranged between said formers when separated to receive the completed articles from said complementary former when compression is applied thereto.

8. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, means for moving the individual formers of the several pairs toward and from one another as said head rotates, means for supplying pulp to the formers of one of said series, and means for applying suction and compression to the several formers of both series at suitably timed intervals as said head rotates.

9. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, carriers for said outer formers mounted for radial movement in said outer portion, a stationary cam successively engaged by the several carriers to move said outer formers toward said inner formers as said head rotates, a box cam for separating said formers, means for supplying pulp to the formers of one of said series, and means for applying suction and compression to the several formers of both series at suitably timed intervals as said head rotates.

10. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, means for moving the individual formers of the several pairs toward and from one another as said head rotates, a pulp tank located between the cylindrical portions of said head at the bottom, and means for applying suction and compression to the several formers of both series at suitably timed intervals as said head rotates.

11. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, means for moving the individual formers of the several pairs toward and from one another as said head rotates, means for supplying pulp to the formers of one of said series, and valve means operated by the rotation of said head for applying suction and compression to the several formers of both series at suitably timed intervals as said head rotates.

12. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, means for moving the individual formers of the several pairs toward and from one another as said head rotates, means for supplying pulp to the formers of one of said series, means for applying suction and compression to the several formers of both series at suitably timed intervals as said head rotates, and a conveyor located between the cylindrical portions of said head at the top.

13. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, carriers for said outer formers mounted for radial movement in said outer portion, a stationary cam successively engaged by the several carriers to move said outer formers toward and away from said inner formers as said head rotates, a pulp tank located between the cylindrical portions of said head at the bottom, valve means operated by the rotation of said head for applying suction and compression to the several formers of both series at suitably timed intervals as said head rotates, and a conveyor located between the cylindrical portions of said head at the top.

14. In a machine for forming articles from pulp, in combination, a pair of complementary foraminous formers, means for supplying pulp to said formers, means for causing said formers to travel as a unit toward and away from said pulp supplying means, means for moving said formers toward and away from one another during their travel as a unit, means for applying suction and compression to said formers respectively at suitably timed intervals during their travel, and means for applying an auxiliary supply of compression to one of said formers during its passage through said pulp supplying means to remove loose particles of pulp from the periphery of said former.

15. In a machine for forming articles from pulp, in combination, a pair of complementary foraminous formers, a pulp trough for supplying pulp to said formers, means for causing said formers to travel as a unit toward and away from said pulp trough, means for moving said formers toward and away from one another during their travel as a unit, and means for applying suction and compression to one of said formers simultaneously during its passage through said pulp trough, whereby the suction serves to collect pulp onto the former to form an article while the compression serves to remove the loose particles of pulp from around the periphery of the former.

16. In a machine for forming articles from pulp, in combination, a pair of complementary foraminous formers, means for supplying pulp to said formers, means for causing said formers to travel as a unit toward and away from said pulp supplying means, means for moving said formers toward and away from one another during their travel as a unit, means for applying suction and compression to said formers respectively at suitably timed intervals during their travel, and means independent of said suction and compression applying means for applying an auxiliary supply of compression to a portion of the periphery of one of said formers while it is passing through the pulp supplying means to remove loose particles of pulp therefrom.

17. In a machine for forming articles from pulp, in combination, a rotary head comprising inner and outer coaxial cylindrical portions, an inner former comprising a shell and a foraminous face carried by said inner portion, an outer former comprising a shell and a complementary foraminous face carried by said outer portion and arranged radially opposite the inner former, and means for applying suction and compression to said former at predetermined times, said inner former having its shell provided with a fluted inner periphery, whereby a greater area of the foraminous face thereof is exposed to the action of suction and compression.

18. In a machine for forming articles from pulp, in combination, a rotary head comprising inner and outer coaxial cylindrical portions, an inner foraminous former carried by said inner portion, and outer foraminous former carried by said outer portion and arranged radially opposite the inner former, a pulp trough arranged in the path of said inner former and through which said former passes during the revolution of the rotary head, means for applying suction and compression to said formers at predetermined times, means for supplying pulp to the bottom of said trough, and means in said trough for agitating the pulp to maintain its constant circulation from the bottom toward the top of said trough.

19. In a machine for forming articles from pulp, in combination, a rotary head comprising inner and outer coaxial cylindrical portions, an inner foraminous former carried by said inner portion, an outer foraminous former carried by said outer portion and arranged radially opposite the inner former, a pulp trough arranged in the path of said inner former and through which said former passes during the revolution of the rotary head, means for applying suction and compression to said formers at predetermined times, means for supplying pulp to the bottom of said trough, exhaust means for the pulp positioned above said supply means, a baffle between the pulp supply and exhaust means, and means below said baffle for agitating the pulp and maintaining it in constant circulation from the bottom toward the top of said trough.

20. In a machine for forming articles from pulp, in combination, a rotary head comprising inner and outer coaxial cylindrical portions, an inner series of foraminous formers carried by said inner portion, an outer series of complementary foraminous formers carried by said outer portion and arranged respectively in pairs with and radially opposite the several formers of the inner series, carriers for said outer formers mounted for radial movement in said outer portion, a stationary cam successively engaged by the several carriers to move said outer formers toward said inner formers as said head rotates, said cam having a portion adapted to separate said formers, a pulp tank located between the cylindrical portions of said head at the bottom, valve means operated by the rotation of said head for applying suction and compression to the several formers of both series at suitably timed intervals as said head rotates, and a conveyor located between the cylindrical portions of said head at the top.

In testimony whereof I affix my signature.

WILLIAM C. JAY.